United States Patent [19]

Pomrink et al.

[11] Patent Number: 5,683,588

[45] Date of Patent: Nov. 4, 1997

[54] STABILIZATION OF CATALYZED AQUEOUS SULFITE AND BISULFITE ION SOLUTIONS

[75] Inventors: Gregory J. Pomrink, Wyncote; Bruce K. Fillipo, Dublin; Eric R. Carver, Croydon; Paul R. Burgmayer, Wayne, all of Pa.

[73] Assignee: BetzDearborn Inc., Trevose, Pa.

[21] Appl. No.: 531,817

[22] Filed: Sep. 21, 1995

[51] Int. Cl.$^6$ ..................................................... C02F 1/20
[52] U.S. Cl. ........................... 210/698; 210/699; 210/750; 210/757; 252/188.28; 252/389.53; 252/396; 422/15; 422/17; 422/19
[58] Field of Search ........................... 210/698–701, 210/750, 757; 252/188.28, 389.2, 389.22, 389.23, 389.53, 396, 400.53; 422/15–17, 19

[56] References Cited

U.S. PATENT DOCUMENTS

| | | | |
|---|---|---|---|
| Re. 28,553 | 9/1975 | von Freyhold | 252/175 |
| 3,214,454 | 10/1965 | Blaser et al. | 260/429.9 |
| 3,431,217 | 3/1969 | Hwa | 252/389 |
| 3,487,018 | 12/1969 | Troscinski | 210/58 |
| 3,617,576 | 11/1971 | Kerst | 210/58 |
| 3,630,938 | 12/1971 | Troscinski | 252/181 |
| 3,873,465 | 3/1975 | DiSimone | 252/181 |
| 3,890,228 | 6/1975 | Hwa et al. | 210/58 |
| 3,899,293 | 8/1975 | Bush | 21/2.7 A |
| 4,231,894 | 11/1980 | Lavin et al. | 252/389 A |
| 4,652,435 | 3/1987 | Nalsuume et al. | 252/188.28 |
| 5,180,498 | 1/1993 | Chen et al. | 210/701 |
| 5,244,600 | 9/1993 | Cuisia et al. | 252/188.28 |
| 5,256,311 | 10/1993 | Rossi et al. | 210/750 |
| 5,270,337 | 12/1993 | Graf | 514/499 |
| 5,284,871 | 2/1994 | Graf | 514/499 |
| 5,527,468 | 6/1996 | Boyette et al. | 210/750 |

*Primary Examiner*—Peter A. Hruskoci
*Attorney, Agent, or Firm*—Alexander D. Ricci; Matthew W. Smith

[57] ABSTRACT

A method for stabilizing an aqueous solution containing sulfite or bisulfite ions and a water-soluble metal catalyst. The method comprises incorporating a stabilizing amount of a alpha substituted carboxylic acid or salt thereof or a vinyl carboxylic acid or salt thereof in the solution. The carboxylic acid inhibits sludge formation when the aqueous solution is stored. The preferred carboxylic acid, citric acid, also enhances the oxygen scavenging rate of the sulfite and bisulfite when the solution is used to treat aqueous systems for oxygen removal.

9 Claims, 2 Drawing Sheets

STABILIZATION OF CATALYZED AQUEOUS SULFITE AND BISULFITE ION SOLUTIONS

FIELD OF THE INVENTION

This invention pertains to the control of dissolved oxygen in water systems and particularly to steam producing systems such as boilers which employ alkali metal sulfite or bisulfite for chemical deaeration.

BACKGROUND OF THE INVENTION

The control of dissolved oxygen in water systems, particularly in steam producing systems such as boiler systems, is important because of oxygen's capacity to promote the corrosion of metallic parts in contact with water.

Dissolved oxygen can be introduced into a system not only in the makeup water but also due to air infiltration of the condensate system. When dissolved oxygen is present in the feedwater, an attack of the feed line, closed heaters and economizer can be expected with the severity of the problem dependent on the concentration of dissolved oxygen and the temperature involved. One of the most serious aspects of oxygen corrosion is that it generally occurs as pitting which is concentrated in a small area of the total metal surface. With pitting, failures can occur even though only, a relatively small portion of the metal has been lost.

The influence of temperature on the corrosivity of dissolved oxygen is particularly important in such equipment as closed heaters and economizers where the water temperature is increased very rapidly. Under such conditions, heat is an additional driving force for the oxidation reaction and therefore even very small quantities of dissolved oxygen in feedwater can cause severe corrosion in such equipment.

When oxygen is present in the feedwater entering the boiler, a portion of the oxygen will be removed from the boiler with the steam. The remainder of the dissolved oxygen can attack the boiler metal. While the point of attack will vary with the boiler design and feedwater distribution, oxygen pitting is usually concentrated adjacent to the water level in the feedwater drum.

The first and most important step in eliminating the corrosive influence of dissolved oxygen is mechanical deaeration of the boiler feedwater. Efficient deaeration will reduce the dissolved oxygen content of the boiler feedwater to a very low value. It is advisable to follow mechanical deaeration by chemical deaeration in order to remove the last traces of dissolved oxygen. Where mechanical deaeration is not employed, chemical deaeration must be used to control the oxygen content of the feedwater.

Sodium sulfite and sodium bisulfite are the chemical agents most commonly employed for chemical deaeration due to their low cost, ease of handling and their lack of scale forming properties. The oxygen scavenging characteristics of sodium sulfite are illustrated by the following reactions depending upon the pH of the system:

$$2Na_2SO_3 + O_2 = 2Na_2SO_4$$

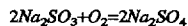

(sodium sulfite+oxygen=sodium sulfate)

$$2Na_2HSO_3 + O_2 = 2Na_2HSO_4$$

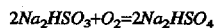

(sodium bisulfite+oxygen=sodium bisulfate)

To assure complete oxygen removal, it is necessary to maintain a residual concentration of sulfite in the boiler water. The residual required depends on a number of factors such as the method of feed and the point of application, the dissolved oxygen concentration and the variation in the dissolved oxygen concentration of the feedwater.

The rate of the sulfite-oxygen reaction is affected by a number of factors, the most important being temperature. The reaction time decreases with increased temperature. At temperatures of 80° C. and above the reaction is quite rapid. It has also been found that the presence of an excess or overfeed of the sodium sulfites will increase the reaction rate. Generally, the reaction proceeds most rapidly at pH values in the vicinity of 9.0–10.0.

Certain water-soluble materials also act as catalysts in speeding this reaction to completion. The most suitable catalysts are the heavy metal cations of two or more valences. Iron, copper, cobalt, nickel, manganese and combinations of the same are among the more effective catalytic aids to the oxygen-sulfite reaction. The catalysts are generally introduced into the system to be treated as their water-soluble salts (i.e., chloride, sulfate, nitrate, etc.).

The concentration of the catalyst added is dependent upon the sulfite concentration in the solution. Concentrations of the catalyst of 0.05 to 1.0% by weight of the sulfite present have been found to be effective. The preferred weight percent used is approximately 0.1%.

Catalyzed sodium sulfite or bisulfite is used in low temperature systems for oxygen removal and also finds application in boiler systems where the feedwater temperature is low, where mechanical deaeration is not complete or where it is essential to obtain rapid reaction for prevention of pitting in feed lines, closed heaters and economizers.

As indicated in the foregoing discussion, the use of catalysts in conjunction with the sodium sulfite and bisulfite has proven quite effective. However, there is a problem associated with aqueous solutions of these products, particularly concentrated aqueous solutions of sodium bisulfite, which occurs during storage in vented storage tanks. In order to maintain residual concentrations of catalyzed sulfite or bisulfite in a system such as a boiler, it is generally necessary to feed aqueous, catalyzed sulfite solution concentrates, on a continuous basis or on a frequent intermittent basis. Thus, aqueous catalyzed sulfite and bisulfite solution concentrates are typically stored near the system to be treated prior to use.

When stored in vented storage containers, solutions of catalyzed sodium sulfite and bisulfite can form insoluble metal sulfite sludges due to the evolution of sulfur dioxide according to the following reaction:

$$2HSO_3^- \rightarrow SO_2\uparrow + H_2O + SO_3^=$$

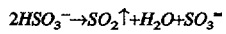

The increase in the sulfite ion concentration, due to the changes in pH which accompany the evolution of $SO_2$, gas leads to the formation of the metal sulfite sludge.

One solution to this problem is disclosed in U.S. Pat. No. 4,231,894 to Lavin et al. Lavin et al. found that a cobalt-catalyzed sulfite product could be stabilized against precipitation by the addition of phosphonate salts and acids such as hydroxyethylene diphosphonic acid (HEDP). Lavin disclosed that the choice of complexant is critical. If the complexing agent is too strong, catalysis is eliminated. If the complexing agent is too weak, the metal catalyst precipitates as sludge. Lavin also demonstrated that HEDP acts not only to stabilize the product but also increases the reaction rate of the metal catalysis.

However, the use of HEDP is not without problems. HEDP can thermally decompose under high temperatures to yield phosphonate and phosphate decomposition products. The HEDP and its thermal decomposition products, in conjunction with sulfate (formed from the reaction of sulfites with oxygen) along with oxygen and sulfite anions interact with the polyvalent metal catalyst and form insoluble sludges. These sludges can block feed lines and pumps and can result in system shutdowns.

Thus a need exists for a method of stabilizing, against precipitation, an aqueous solution containing metal catalyzed sulfite and bisulfite ions without adversely affecting the catalytic effect of the polyvalent metal catalyst.

It is therefore an object of this invention to provide a method for stabilizing an aqueous solution containing sulfite or bisulfite ions and containing a water-soluble polyvalent metal catalyst without diminishing the catalytic effect of the polyvalent metal catalyst.

It is also an object of this invention to provide a method for increasing the oxygen scavenging rate of an aqueous solution containing an alkali metal sulfite or bisulfite and a water soluble polyvalent metal catalyst.

It is also an object of this invention to provide a stabilizer for aqueous solutions containing sulfite or bisulfite ions and a water soluble polyvalent metal catalyst.

SUMMARY

To achieve the foregoing and other objects, the present invention is a method for stabilizing, against precipitation, an aqueous solution containing sulfite ions or bisulfite ions and containing a water-soluble polyvalent metal catalyst without adversely affecting the catalytic effect of the polyvalent metal catalyst. The method comprises incorporating in the solution an alpha substituted carboxylic acid or a salt thereof, or a vinyl carboxylic acid or salt thereof effective as a stabilizer. The preferred alpha substituted carboxylic acid, citric acid, also increases the oxygen scavenging rate of the catalyzed sulfite and bisulfite solutions when the citric acid containing solutions are used to treat aqueous systems for oxygen removal.

The invention has particular utility in steam producing systems such as boiler systems which utilize catalyzed sulfite and bisulfite compositions to scavenge oxygen.

BRIEF DESCRIPTION OF THE DRAWINGS

The accompanying drawings, which are incorporated in and form a part of the specification, illustrates the embodiments of the present invention and together with the description, serves to explain the principles of the invention.

DETAILED DESCRIPTION OF THE PREFERRED EMBODIMENTS

Figure 1:
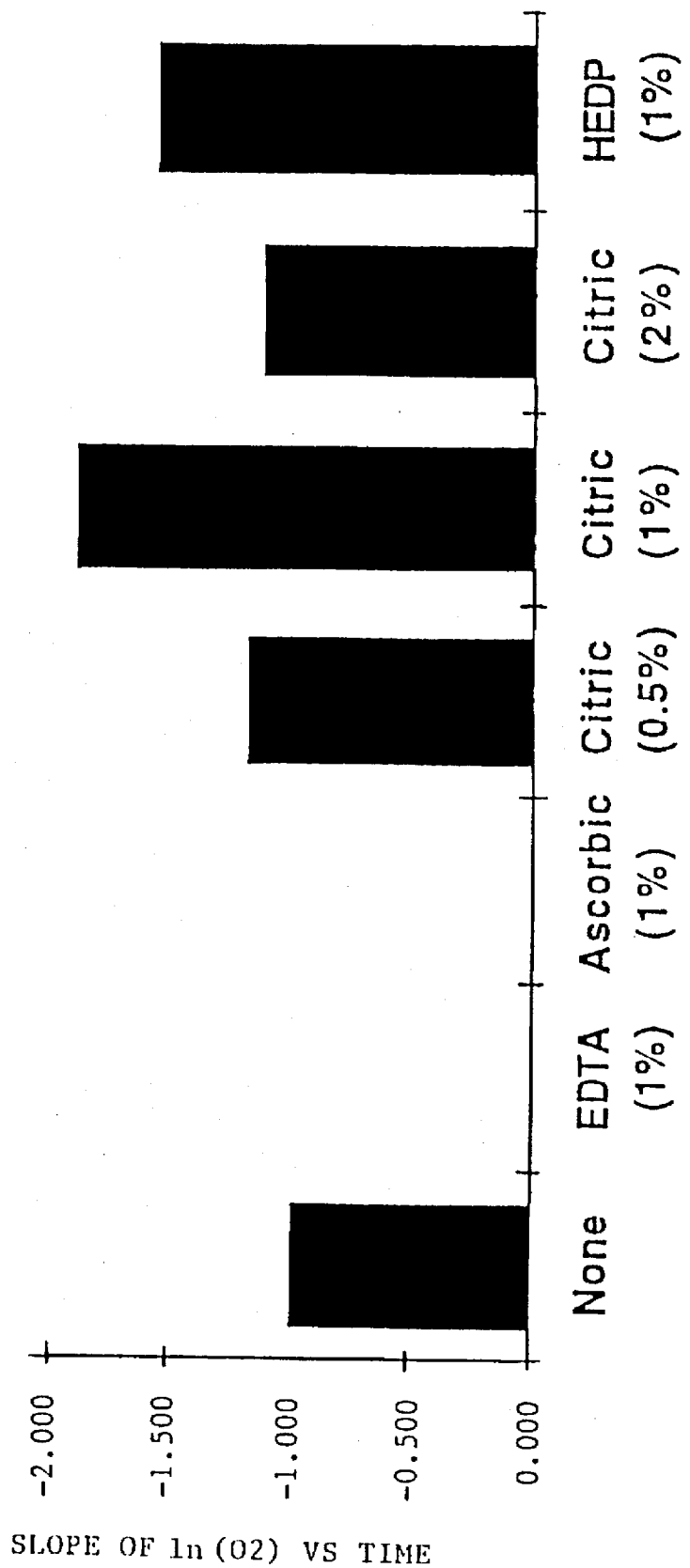
FIG. 1 is a bar chart of the slope of the log of oxygen concentration versus time for a sulfite solution without a stabilizer and for sulfite solutions with a stabilizer.

The present invention provides a method to stabilize aqueous solutions of alkali metal sulfite or bisulfite containing a water soluble polyvalent metal catalyst.

The method comprises incorporating into the aqueous solution a stabilizing amount of an alpha substituted carboxylic acid or acid salt thereof or a vinyl carboxylic acid or salt thereof. The acid and acid salts disassociate in the aqueous solution to form alpha substituted carboxylate ions and vinyl carboxylate ions which inhibit the formation of insoluble metal sulfite sludges, yet do not adversely inhibit the catalytic effect of the polyvalent metal catalyst.

Unless specified otherwise hereinafter the term "acid" is inclusive of both the acid and acid salt forms of alpha substituted carboxylate ion or vinyl carboxylate ion producing substances.

The preferred alpha substituted carboxylic acids are citric acid, tartaric acid, saccharic acid, gluconic acid, glycolic acid and 2-phosphonobutane-1,2,4-tricarboxylic acid.

The preferred vinyl carboxylic acids are dihydroxyfumaric acid, diethylenetriaminepentaacetic acid, maleic anhydride, aconitic acid and N-hydroxyethylenediaminetriacetic acid. The most preferred acid is citric acid.

Diethylenetriaminepentaacetic acid penta sodium salts are available from Dow under the trademark Versenex® 80 and 2-phosphonobutane-1,2,4-tricarboxylic acid is available commercially from Bayer Corp. under the trademark Bayhibit® AM. N-hydroxyethylenediaminetriacetate trisodium salt is available commercially from Dow under the trademark Versenol® 120. Ethylenediaminetetraacetic acid tetrasodium salt is available commercially under the trademark Versene® 100 from Dow.

The amount of alpha substituted carboxylic acid or vinyl carboxylic acid effective as a stabilizer is from about 0.1 to about 4 weight percent of acid in an aqueous metal catalyzed sulfite or bisulfite solution. Concentrations of acids greater than about 4 weight percent exhibit precipitation due to supersaturation of the solution.

Citric acid also increases the rate of oxygen scavenging reactions by metal catalyzed sulfite and bisulfite solutions in addition to inhibiting sludge formation. The amount of citric acid effective to enhance sulfite and bisulfite oxygen scavenging is from about 0.5 weight percent to about 2 weight percent and preferably about 1 weight percent of said citric acid in the aqueous, metal catalyzed, sulfite or bisulfite solution.

The carboxylic acids of this invention are effective for solution stabilization when used alone or can be utilized with other known stabilizers such as HEDP.

The invention will now be further described with reference to a number of specific examples which are to be regarded solely as illustrative and not restricting the scope of the present invention.

EXAMPLE I

Twenty-two sulfite solutions were prepared and subjected to temperatures of from 5° C. to 50° C. over a period of six weeks to determine the effect of additives on solution stability. The solution compositions and stability results are shown in Table I.

TABLE I

| Solution | Weight Percent Composition | Appearance | Stability |
|---|---|---|---|
| A | 69.28% H₂O 30.55% NaSO₃ 0.125% HEDP 0.045% CoCl₂ | light yellow | slight precipitation |
| B | A + 5% ascorbic acid | light yellow | stable |
| C | A + 5% citric acid | light yellow | stable |
| D | A + 5% coagulant* | clear | |
| E | A + 0.5 CoCl₂ | yellow/pink | slight precipitation |
| F | E + 5% ascorbic acid | yellow/pink | stable |
| G | E + 5% citric acid | yellow/pink | stable |
| H | E + 5% coagulant* | red/pink | stable |
| I | E | yellow/pink | slight precipitation |
| J | E + 5% ascorbic acid | yellow/pink | stable |
| K | E + 5% citric acid | pink | stable |

TABLE I-continued

| Solution | Weight Percent Composition | Appearance | Stability |
|---|---|---|---|
| L | E + 3% citric acid | pink | stable |
| M | E + 1% citric acid | pink | stable |
| N | E + 5% coagulant* | red/pink | stable |
| O | E without HEDP | yellow/pink | precipitation |
| P | O + 5% ascorbic acid | yellow/pink | precipitation |
| Q | O + 5% citric acid | pink | slight precipitation |
| R | O + 3% citric acid | pink | stable |
| S | O + 1% citric acid | pink | stable |
| T | O + 5% coagulant* | red/pink | precipitation |
| U | E + 10% water | pink | stable |
| V | O + 10% water | pink | stable |

*The coagulant was an acrylate copolymer available commercially from Betz Laboratories, Inc.

EXAMPLE II

A second set of solutions A–V were prepared and subjected to storage at 100° C. to simulate high temperature application conditions. A third set of solutions A–V were dehydrated at 100° C. and evaluated for scale formation and integrity. The results are shown in Table II.

TABLE II

| Solution | Evaporation/Deposit | Scale | Precipitation |
|---|---|---|---|
| A | loose precipitation/crust | N/A | N/A |
| B | very light precipitation/crust | N/A | N/A |
| C | very light precipitation/no crust | N/A | N/A |
| D | powder/solid | N/A | N/A |
| E | crust on surface/precipitation | heavy | heavy |
| F | crust on surface/precipitation | moderate | heavy |
| G | liquid/slight precipitation | none | none |
| H | crust on surface/heavy precipitation | moderate | heavy |
| I | crust on surface/heavy precipitation | heavy | heavy |
| J | crust on surface/heavy precipitation | moderate | heavy |
| K | liquid/heavy precipitation | none | slight |
| L | liquid/mild precipitation | none | none |
| M | liquid/slight precipitation | none | none |
| N | crust on surface/heavy precipitation | heavy | slight |
| O | crust on surface/heavy precipitation | moderate | heavy |
| P | crust on surface/heavy precipitation | heavy | heavy |
| Q | crust on surface/mild precipitation | none | mild |
| R | liquid/mild precipitation | none | none |
| S | liquid/slight precipitation | none | none |
| T | solid | heavy | heavy |
| U | liquid/slight precipitation | none | slight |
| V | liquid/slight precipitation | none | slight |

Examples I and II show that citric acid containing solutions were more stable and produced less precipitate than non-citric acid containing solutions when stored at temperatures of 100° C. or less. The citric acid containing solutions also produced less crust and precipitate when evaporated than solutions which did not contain citric acid.

EXAMPLE III

Several samples of sulfite Solution A as in Example I were spiked with 5000 ppm of $CoCl_2$ followed by addition of 1% by weight of an additive to determine the stabilization effect on the sulfite solutions.

One hundred grams of the control and samples containing the additives were placed in 4 oz. glass bottles without lids containing a 316 stainless steel coupon. The bottles containing the samples and coupon were subjected to a temperature of 60° C. for 24 hours. Sample color and presence of precipitate were recorded prior to filtering. The filtrate was diluted to 1% volume in the presence of HCl and peroxide. The diluted filtrate samples were evaluated for the concentration of Co, $PO_4^{-2}$, and $SO_4^{-2}$ using Inductively Coupled Plasma analysis (ICP). Co and $PO_4^{-2}$ concentrations were adjusted for water loss due to evaporation by using 3300 ppm $SO_4^{-2}$ as a standard concentration.

The results are summarized in Tables IIIA and IIIB.

TABLE IIIA

| Sample | Additive | Initial Color | Stability @ 24 hrs @ 60° C. |
|---|---|---|---|
| AA | theoretical | N/A | N/A |
| BB | citric acid | orange | stable |
| CC | control (no heat) | purple | N/A |
| DD | dihydroxyfumaric acid | orange | slight precipitate |
| EE | saccharic acid | purple | medium precipitate |
| FF | tartaric acid | purple | medium precipitate |
| GG | diethylenetriamine-pentaacetic acid penta sodium salt | purple | medium precipitate |
| HH | 2-phosphonobutane-1,2,4-tricarboxylic acid | orange | very slight precipitate |
| II | glycolic acid | purple | medium precipitate |
| JJ | maleic anhydride | orange | medium precipitate |
| KK | aconitic acid | orange | heavy precipitate |
| LL | gluconic acid | purple | heavy precipitate |
| MM | N-hydroxyethylenediamine triacetate trisodium salt | purple | medium precipitate |
| NN | ethylenediamine tetraacetic acid tetrasodium salt | purple | heavy precipitate |
| OO | control (heated) | purple | heavy precipitate |
| PP | diethylene glycol | light purple | heavy precipitate |
| QQ | triethanolamine | purple | heavy precipitate |

TABLE IIIB

| Sample | [Co] (ppm) | [PO₄] (ppm) | [SO₄] (ppm) | [Co] [PO₄] (ppm) | [Co] [SO₄] (ppm) | adj. [Co] (ppm) | adj. [PO₄] (ppm) |
|---|---|---|---|---|---|---|---|
| AA | 16.5 | 8.7 | 3300 | 1.9 | 5.0 | 16.5 | N/A |
| BB | 17.1 | 9.3 | 3560 | 1.8 | 4.8 | 15.9 | 8.6 |
| CC | 15.9 | 8.5 | 3620 | 1.8 | 4.4 | 13.9 | N/A |
| DD | 18.9 | 8.2 | 4070 | 2.3 | 4.6 | 15.3 | 6.6 |
| EE | 16.1 | 5.8 | 3740 | 2.8 | 4.3 | 14.2 | 5.1 |
| FF | 15.1 | 7.1 | 3650 | 2.1 | 4.1 | 13.7 | 6.4 |
| GG | 15.0 | 6.5 | 3660 | 2.3 | 4.1 | 13.5 | 5.9 |
| HH | 14.8 | 30.9 | 3630 | N/A | 4.1 | 13.5 | N/A |
| II | 14.9 | 6.6 | 3660 | 2.3 | 4.1 | 13.4 | 6.0 |
| JJ | 13.6 | 5.0 | 3530 | 2.7 | 3.9 | 12.7 | 4.7 |
| KK | 13.5 | 4.9 | 3630 | 2.8 | 3.7 | 12.3 | 4.5 |
| LL | 13.3 | 5.0 | 3560 | 2.7 | 3.7 | 12.3 | 4.6 |
| MM | 13.6 | 5.4 | 3780 | 2.5 | 3.6 | 11.9 | 4.7 |
| NN | 10.7 | 4.6 | 3720 | 2.3 | 2.9 | 9.5 | 4.1 |
| OO | 10.3 | 3.0 | 3750 | 3.4 | 2.7 | 9.1 | 2.6 |
| PP | 9.9 | 2.9 | 3650 | 3.4 | 2.7 | 9.1 | 2.6 |
| QQ | 9.4 | 2.5 | 3760 | 3.8 | 2.5 | 8.3 | 2.1 |

The high temperature tests, Examples I and II, were evaluated to simulate boiler feed system conditions. Example III was evaluated to simulate feed line and oxygen scavenging conditions.

Example III shows that the sample treated with citric acid did not exhibit any precipitation and had higher concentrations of cobalt, $PO_4^{-2}$, a higher $[CO]/[SO_4^{-2}]$ ratio and a lower $[CO]/[PO_4^{-2}]$ ratio than the heated control OO and the other samples. Of the remaining materials, those additives which are broadly classified as alpha substituted carboxylic acids and vinyl carboxylic acids had improved stability over the heated control with dihydroxyfumaric acid approaching the performance of citric acid in the stability tests.

EXAMPLE IV

A test was performed using a room temperature oxygen scavenging apparatus which consists of a three necked flask fitted with a dissolved oxygen electrode in one neck, a pH electrode in a second neck, and a rubber septum at a third neck. Aerated, demineralized water in the flask was adjusted to a fixed pH with sodium hydroxide and held at an equilibrium temperature fixed by a water bath surrounding the flask. Following injection of a scavenger/catalyst mixture through the rubber septum, the dissolved oxygen concentration was recorded as a function of time. The numbers shown in Table IV are based upon the initial rates of reaction for each scavenger with dissolved oxygen. The rate is measured by the slope of the plot of log (oxygen concentration at a given time divided by initial oxygen concentration) versus the time in minutes. The slopes are taken from the first minute of the test run. Because the rate of oxygen removal is measured, larger negative values indicate faster, increased, more desirable reaction rates. The test was designed to run under pseudo-first order reaction kinetics with respect to the scavenger/catalyst. Thus, the test is designed so that the rate of oxygen removal is controlled by scavenger/catalyst/stabilizer combinations. The assumption of first order kinetics breaks down later in the test leading to a curved line. In these cases, data taken early in the test best represents the pseudo-first order kinetics. The following conditions were used during the tests:

Temperature: 21° C. (70° F.)
pH: 10.0
pH adjustment with 1N NaOH
Water: Air saturated, demineralized
Scavenger Concentration: $6.3 \times 10^{-4}$ molar of sulfite
Scavenger Volume: 1 mL
Catalyst: Cobalt
Catalyst Concentration: $5.1 \times 10^{-5}$ molar
Stabilizer Concentration Ranges: 0.5 to 2% by weight
The results are shown in Table IV and FIG. 1.

TABLE IV

Slope of ln[O2] vs time for various Cobalt stabilizers in sulfite scavenger

| Stabilizer | Slope (0 to 1.0 min.) | | | |
|---|---|---|---|---|
| | Run #1 | Run #2 | Ave | StDev |
| None | −0.950 | −1.030 | −0.990 | 0.057 |
| EDTA (1%) | −0.004 | −0.001 | −0.003 | 0.002 |
| Ascorbic (1%) | −0.008 | −0.002 | −0.005 | 0.004 |
| Citric (0.5%) | −1.230 | −1.130 | −1.180 | 0.071 |
| Citric (1%) | −1.890 | −1.920 | −1.905 | 0.021 |
| Citric (2%) | −1.110 | −1.130 | −1.120 | 0.014 |
| HEDP (1%) | −1.530 | −1.600 | −1.565 | 0.049 |

The results clearly show that citric acid is far superior to EDTA (ethylenediaminetetraacetic acid) or ascorbic acid in enhancing the oxygen scavenging reaction. Both EDTA and ascorbic acid eliminate the catalytic effect of the metal catalyst whereas citric acid and HEDP both enhanced the oxygen scavenging reaction.

EXAMPLE VI

Using the apparatus and test conditions described in Example IV, 1% by weight solutions of citric, gluconic, saccharic and tartaric acid were tested to determine their effect on the rate of oxygen scavenging by cobalt catalyzed sulfite solutions. The results are shown in FIG. 2.

Figure 2:
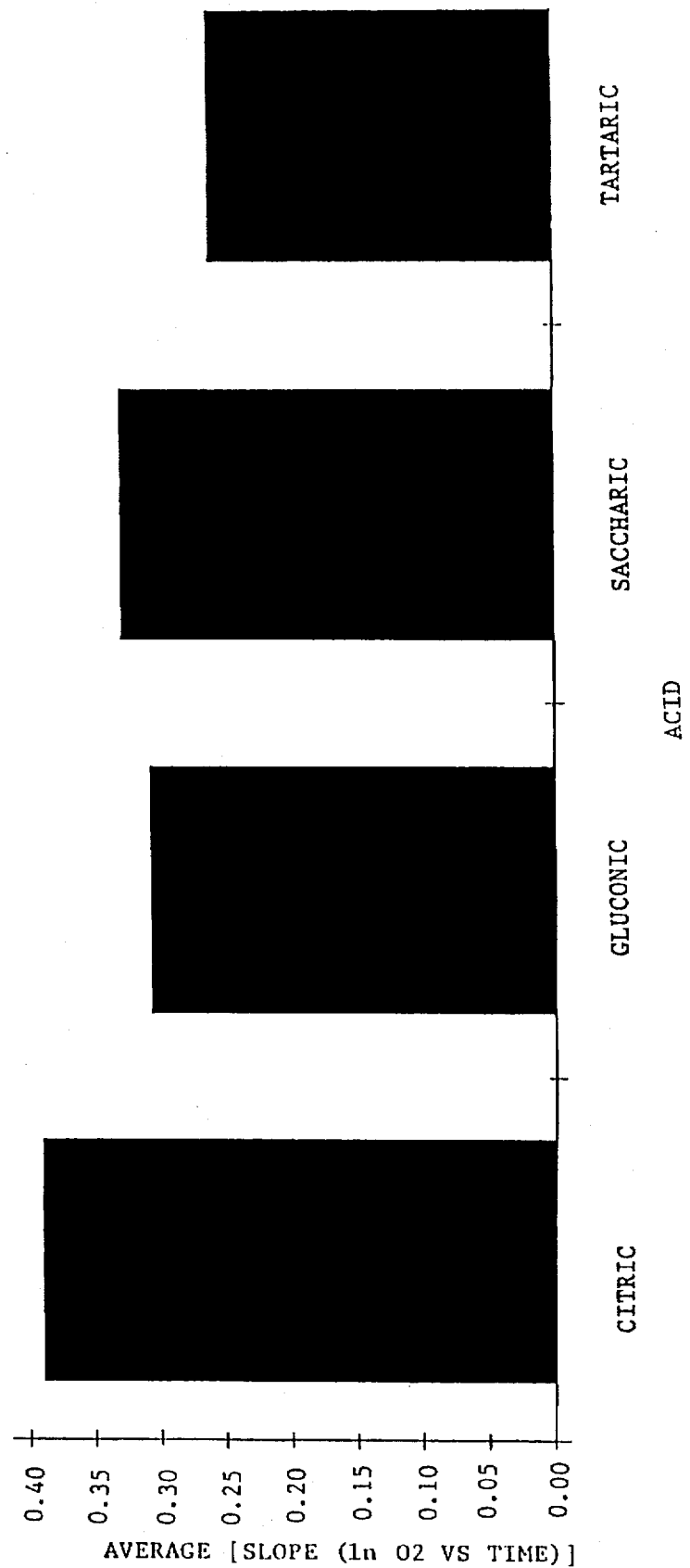
FIG. 2 is a bar chart of the slope of the log of oxygen concentration versus time for a sulfite solution with citric acid, gluconic acid, saccharic acid and tartaric acid stabilizers.

FIG. 2 shows that citric acid has the largest enhancing effect on the oxygen scavenging reaction, and is therefore the preferred substituted alpha hydroxycarboxylic acid for catalyzed sulfite solution stabilization and oxygen scavenging.

Thus, the invention provides a method for stabilizing an aqueous solution containing sulfite or bisulfite ions and a water-soluble metal catalyst against sludge formation. The method comprises incorporating a stabilizing amount of an alpha substituted carboxylic acid or vinyl carboxylic acid in the solution. The carboxylic acid inhibits sludge formation in the aqueous solution during solution storage and use.

The citric acid embodiment of the invention has particular utility for stabilizing and for enhancing the oxygen removal rate of aqueous, metal catalyzed sulfite ion or bisulfite ion solutions utilized to scavenge oxygen from boiler water.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method for stabilizing an aqueous solution containing sulfite or bisulfite ion oxygen scavengers and a cobalt catalyst against precipitation without diminishing the catalytic effect of the cobalt catalyst, said method comprising adding to said solution a citric acid or salt thereof effective as a stabilizer, in an amount effective for the purpose of solution stabilization.

2. The method of claim 1 wherein said amount of citric acid effective for the purpose of solution stabilization is from about 0.1 weight percent to about 4 weight percent of said acid in said solution.

3. The method of claim 1 further comprising incorporating into said solution a stabilizing amount of a phosphonate acid or phosphonate salt.

4. The method of claim 3 wherein said phosphonate acid is hydroxyethylene diphosphonic acid.

5. A method of increasing the oxygen scavenging rate of cobalt catalyzed sulfite or bisulfite in an aqueous solution, said method comprising incorporating in said solution citric acid or salts thereof, in an amount effective for the purpose of increasing the oxygen scavenging rate.

6. The method of claim 5 wherein said amount of citric acid effective for the purpose of increasing the oxygen scavenging rate is from about 0.5 weight percent to about 2 weight percent of said citric acid in said solution.

7. The method of claim 5 wherein said aqueous solution is part of a boiler water or steam producing system.

8. A method for inhibiting the formation of insoluble sludges in an aqueous solution containing sulfite or bisulfite ions and a water-soluble cobalt catalyst, and for increasing the oxygen scavenging rate of said sulfite or bisulfite ions and said catalyst, said method comprising adding to said solution an amount of citric acid or salts thereof effective as a solution stabilizer and effective as an oxygen scavenging rate increaser.

9. The method of claim 8 wherein said amount of citric acid effective as a solution stabilizer and effective as an oxygen scavenging rate increaser is from about 0.5 weight percent to about 2 weight percent of said citric acid in said solution.

* * * * *